: (12) United States Patent
Barbarossa

(10) Patent No.: US 7,046,374 B1
(45) Date of Patent: May 16, 2006

(54) INTERFEROMETERS FOR OPTICAL COMMUNICATIONS UTILIZING PHOTO-SENSITIVE MATERIALS

(75) Inventor: Giovanni Barbarossa, Saratoga, CA (US)

(73) Assignee: Avanex Corporation, Fremont, CA (US)

( * ) Notice: Subject to any disclaimer, the term of this patent is extended or adjusted under 35 U.S.C. 154(b) by 193 days.

(21) Appl. No.: 10/388,580

(22) Filed: Mar. 13, 2003

Related U.S. Application Data

(60) Provisional application No. 60/365,093, filed on Mar. 14, 2002.

(51) Int. Cl.
*G01B 9/02* (2006.01)
(52) U.S. Cl. ..................................... 356/519
(58) Field of Classification Search ................ 356/506, 356/480, 454, 519, 521
See application file for complete search history.

(56) References Cited

U.S. PATENT DOCUMENTS

| | | | |
|---|---|---|---|
| 3,699,353 A * | 10/1972 | Bechtold et al. | 359/329 |
| 4,420,218 A * | 12/1983 | Rubanov et al. | 359/24 |
| 5,185,643 A * | 2/1993 | Vry et al. | 356/506 |
| 5,381,253 A * | 1/1995 | Sharp et al. | 349/18 |
| 5,412,673 A * | 5/1995 | Caprara et al. | 372/19 |
| 5,552,912 A * | 9/1996 | Sharp et al. | 349/117 |
| 6,674,782 B1 * | 1/2004 | Roosen et al. | 372/94 |
| 6,680,792 B1 * | 1/2004 | Miles | 359/291 |

* cited by examiner

*Primary Examiner*—Hwa (Andrew) Lee
(74) *Attorney, Agent, or Firm*—Patterson & Sheridan LLP

(57) ABSTRACT

An interferometer includes: a first glass plate optically coupled to a second glass plate, forming an optical interferometric cavity therebetween; a first reflective coating coupled to the first glass plate within the optical interferometric cavity, where the first reflective coating is partially reflective; a second reflective coating coupled to the second glass plate within the optical interferometric cavity, where the second reflective coating is at least partially reflective; and a tuning plate residing within the interferometric cavity and optically coupled to the first and second reflective coatings, where the tuning plate comprises a photosensitive material, where a refractive index of the photosensitive material may be modified by exposure to light. The interferometer is adjusted through exposure of the tuning plate to light so that its pass, transmission, or reflection bands align to standard channel positions, or the pass bands of an apparatus incorporating the interferometer align to standard channel positions.

23 Claims, 11 Drawing Sheets

INTERFEROMETERS FOR OPTICAL COMMUNICATIONS UTILIZING PHOTO-SENSITIVE MATERIALS

CROSS-REFERENCE TO RELATED APPLICATION

This application is claiming under 35 USC 119(e) the benefit of provisional patent application Ser. No. 60/365,093 filed on Mar. 14, 2002.

FIELD OF THE INVENTION

The present invention relates to optical interferometers. More particularly, the present invention relates to an interferometer utilized in optical communications comprising a photosensitive material disposed between two parallel reflective surfaces, wherein the change in refractive index of the photosensitive material upon exposure to ultraviolet light provides adjustment capability to the interferometer.

BACKGROUND OF THE INVENTION

The use of optical fiber for long-distance transmission of voice and/or data is now common. As the demand for data carrying capacity continues to increase, there is a continuing need to utilize the bandwidth of existing fiber-optic cable more efficiently. An established method for increasing the carrying capacity of existing fiber cable is Wavelength Division Multiplexing (WDM). In this method, multiple information channels are independently transmitted over the same fiber using multiple wavelengths of light and each light-wave-propagated information channel corresponds to light within a specific wavelength range or "band."

In this specification, these individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

An optical interferometer is a device that produces a periodic phase modulation of light within a range of wavelengths. When an optical interferometer is incorporated as a component within another optical apparatus, such as a wavelength division multiplexer or de-multiplexer, this periodic phase modulation may be utilized advantageously to produce periodic transmission, reflection, optical delay or polarization properties within optical signals or composite optical signals passed through the apparatus. However, the peak positions of the periodic optical properties associated with the interferometer must be precisely adjusted so as to align these peak positions to standard channel positions. This requires precise adjustment of the optical path length within the interferometer, often with a tolerance of just a few nanometers.

Various mechanical, thermo-optic, electro-optic or magneto-optic methods have been employed to provide adjustment or tuning capabilities to optical interferometers. Although these methods provide adequate tuning capabilities, they invariably add additional optical components, mechanical components (or moveable components) and/or electrical connections to the interferometer, thereby increasing the complexity and difficulty of fabricating and aligning the interferometer and potentially reducing the stability and optical throughput of the interferometer.

Accordingly, there remains a need for an improved interferometer that is easily adjustable. The improved interferometer should not incorporate unnecessary additional mechanical or electrical elements into the optical path within the interferometer and should not disturb or move any of the optical components disposed within or associated with this optical path. The present invention addresses such a need.

SUMMARY OF THE INVENTION

The present invention addresses the above stated needs through the disclosure of an interferometer and a method for adjusting the interferometer. An interferometer in accordance with the present invention may be easily adjusted so that its pass bands, transmission bands or reflection bands align to standard channel positions or such that the pass bands of an apparatus incorporating the interferometer align to standard channel positions. A first preferred embodiment of an interferometer in accordance with the present invention comprises two transparent plates separated by at least one spacer and comprising respective partially-reflecting parallel surfaces such that an optical cavity is formed between the surfaces, wherein a tuning plate comprising a photosensitive material is optically coupled between the two partially reflecting surfaces.

A second preferred embodiment of an interferometer in accordance with the present invention comprises a first transparent plate comprising a partially-reflecting surface, a second plate comprising an approximately 100% reflecting surface parallel to the partially reflecting surface, at least one spacer separating the plates such that an optical cavity is formed between the surfaces, wherein a tuning plate comprising a photosensitive material is optically coupled between the two partially reflecting surfaces.

A third preferred embodiment of an interferometer in accordance with the present invention comprises a first transparent plate comprising a partially-reflecting surface, a second plate comprising an approximately 100% reflecting surface parallel to the partially reflecting surface, at least one spacer separating the plates such that an optical cavity is formed between the surfaces, an internal birefringent waveplate optically coupled between the partially reflective coating and the 100% reflective coating and an external birefringent waveplate optically coupled to the first transparent plate outside the optical cavity, wherein a tuning plate comprising a photosensitive material is optically coupled between the two partially reflecting surfaces. The reflective surfaces may be formed from reflective or partially reflective coatings disposed on the plates.

The tuning plate comprising an interferometer in accordance with the present invention comprises a photosensitive material whose refractive index may be permanently changed upon exposure to ultraviolet (UV) light. The change in refractive index produces small precise changes in the optical path length within the optical cavity such that maxima and minima in periodic curves of transmission, reflection, phase, or polarization rotation are shifted by precisely controlled amounts. These shifts are utilized, within devices incorporating the interferometer, to adjust the positions of the transmission, reflection or polarization rotation into correspondence with standard optical channel positions.

DETAILED DESCRIPTION

The present invention provides an improved interferometer and a method for adjusting an interferometer during fabrication. The following description is presented to enable one ordinary skill in the art to make and use the invention and is provided in the context of a patent application and its requirements. Various modifications to the preferred embodiments will be readily apparent to those skilled in the art and the generic principles described herein may be applied to other embodiments. Thus, the present invention is not intended to be limited to the embodiments shown but is to be accorded the widest scope consistent with the principles and features described herein. In order to gain a detailed understanding of the construction and operation of the interferometer of the present invention, the reader is referred to the appended FIGS. 1A–5 in conjunction with the following description.

Figure 1A:
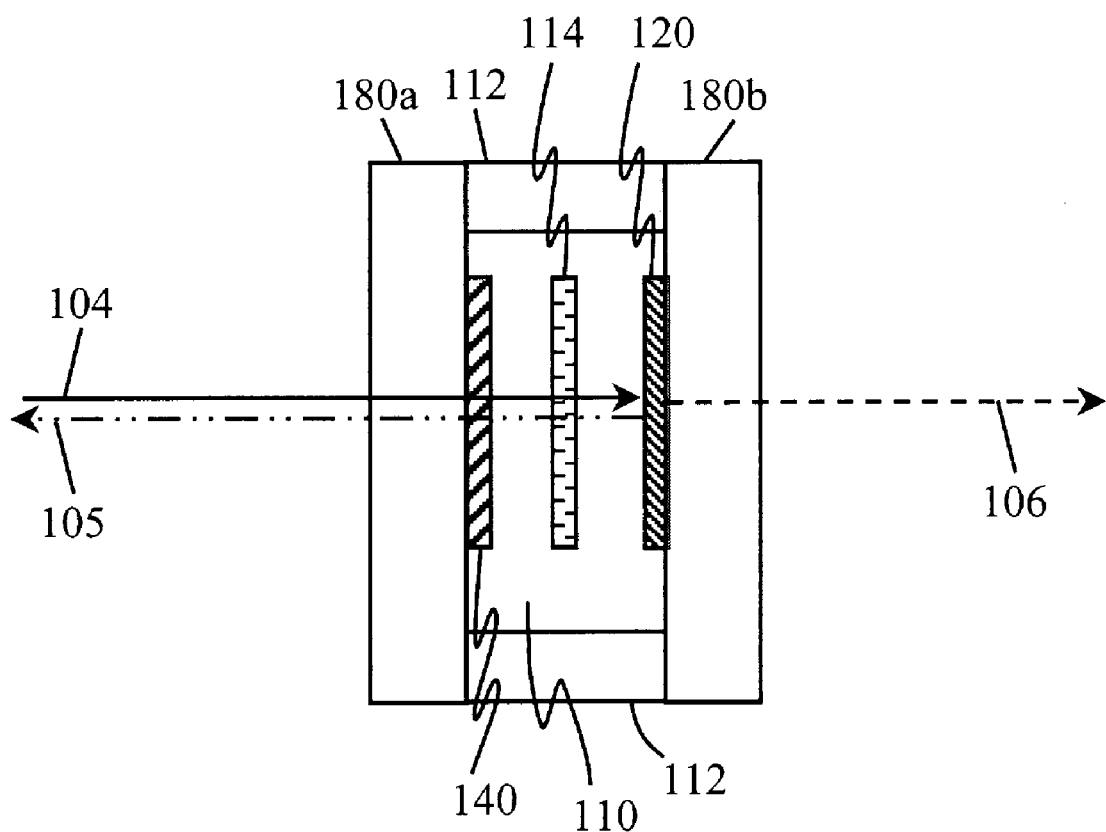
FIG. 1A is an illustration of a first preferred embodiment of an interferometer in accordance with the present invention.

FIG. 1A is an illustration of a first preferred embodiment of an interferometer in accordance with the present invention. The interferometer 100 (FIG. 1) comprises a Fabry-Perot interferometer. The Fabry-Perot interferometer 100 comprises two glass plates 180a–180b optically coupled to one another so as to form an optical interferometric cavity 110 between the plates 180a–180b, wherein the inside face (that is, the face that faces into the cavity 110) of the first glass plate 180a is coated with a first partially reflective coating 140 and the inside face of the second glass plate 180b is coated with a second partially reflective coating 120 wherein the two coatings are substantially parallel to one another. The two glass plates 180a–180b are separated by a spacer or spacers 112, such that the interferometric cavity 110 between the first partially reflective coating 140 and the second partially reflective coating 120 maintains a constant width. The spacers 112 preferably comprise a zero-thermal-expansion or low-thermal-expansion material. A tuning plate 114 comprising a photosensitive material resides within the cavity 110 disposed between and optically coupled to both the first 140 and the second 120 partially reflective coatings. The tuning plate 114 comprises a material whose refractive index may be (or has been) permanently modified by exposure to actinic, typically ultraviolet, radiation.

An input composite optical signal 104 enters the Fabry-Perot interferometer 100 through the first plate 180a. Through constructive and destructive interference of light within the cavity 110, the channels comprising the composite optical signal 104 are separated into a reflected light 105 and a transmitted light 106 which exit the interferometer 100 via the first glass plate 180a and second glass plate 180b, respectively. Through the well-known operation of a Fabry-Perot interferometer, the reflected light 105 comprises a first periodic pattern of wavelengths and the transmitted light 106 comprises a second periodic pattern of wavelengths and the wavelengths of the reflected light 105 and the transmitted light 106 are interleaved with one another.

The spacings and positions of the first and second periodic patterns of wavelengths reflected by and transmitted by the interferometer 100 depend upon the optical path length between the first 140 and the second 120 partially reflective coatings. This optical path length must be configured so as to cause these spacings and positions to correspond to pre-defined channel wavelengths or frequencies of the composite optical signal 104. However, since all components of the interferometer 100 reside in fixed positions, it is not possible to perform mechanical adjustment of the optical path length so as to provide such an optical path length. Instead, the optical path length is adjusted by exposing the tuning plate 114 to actinic radiation such that a permanent refractive index change is induced in the photosensitive material comprising the tuning plate 114. Such permanent refractive index change is well-known for a number of photosensitive materials including bulk and thin film amorphous germanates, germano-silicates or borogermano-silicates, either with or without hydrogen, lead-silicate glasses or phosphorus-doped silica glass. Typically, the refractive index change is induced by quantified exposure to laser light of approximately 244–248 nm wavelength. If the photosensitive material comprises a phosphorus-doped silica glass, exposure to 193 nm laser light is preferable. If the photosensitive material comprises a lead-silicate glass, 266 nm actinic light may be utilized. Alternatively, the actinic light may be supplied by a high-output-power UV lamp, such as an excimer lamp. Refractive index changes as high as 0.09 have been reported, depending upon the type of photosensitive material and the length and intensity of exposure to actinic radiation.

The magnitude of tuning of the frequency shift of the interferometer 100, and other interferometers in accordance with the present invention, is now analyzed. The following analysis is specific to a Fabry-Perot type interferometer but may be extended, in straightforward fashion, to other interferometers in accordance with the present invention.

As is well-known, the transmission function, r, of a Fabry-Perot interferometer is given by the following equation $$\tau = \frac{1}{1 + \left(\frac{4R}{1-R^2}\right)\sin^2\left(\frac{\varphi}{2}\right)} \quad \text{Eq. 1}$$

wherein R is the reflectivity of the mirrors and $\varphi$ is the phase change of a light ray for one round-trip between the mirrors. Under the assumptions that there are no phase changes at the mirror surfaces and that the path of the light ray is perpendicular to the parallel mirror surfaces, then, the phase change $\varphi$ is given by $$\varphi = \left(\frac{2\pi}{\lambda}\right)2L_0 = \left(\frac{4\pi L_0}{c}\right)v \quad \text{Eq. 2}$$

wherein $\lambda$ is the wavelength of light in vacuum, $L_0$ is the optical path length between the two mirrors, c is the speed of light in vacuum and v is the frequency of light in vacuum. By combining Eq. 1 and Eq. 2, it is clear that the transmission, $\tau$, is periodic in frequency, with the period or, in other words, the Free Spectral Range (FSR), given by $$FSR = \frac{c}{2L_0} \quad \text{Eq. 3}$$

It is further evident from Eq. 1 that, at a hypothetical null frequency, $v_0=0$, the corresponding transmission $\tau_0$ mathematically assumes its maximum value of unity, i.e., $\tau_0=1$, which is true for all values of $L_0$ and R. Although the position of $v_0$ is fixed, the positions of other local maxima, i.e., "peaks", in the transmission curve can vary depending upon $L_0$. The first peak at finite frequency occurs at a frequency $v_1=FSR=c/2L_0$. The frequency position of this first peak shifts by a small amount as $L_0$ varies, with the rate of the frequency shift, $dv_1/dL_0$, of the first peak in the transmission curve given by $$\frac{dv_1}{dL_0} = \frac{d(FSR)}{dL_0} = \frac{-c}{2L_0^2} = \frac{-(FSR)}{L_0} \quad \text{Eq. 4}$$

The rate of shift of the $i^{th}$ transmission peak, $V_i$, is given by $$\frac{dv_i}{dL_0} = i\frac{d(FSR)}{dL_0} = \frac{-i(FSR)}{L_0} \approx \frac{-v_i}{L_0} \quad \text{Eq. 5}$$

wherein the final approximate equality results from the fact that $i \approx v_i/(FSR)$ since the change in FSR is negligible for small changes in optical path length. The total optical path length $L_0$ between the two reflective surfaces is the sum of the partial optical path lengths of each of the plurality of n optical components (n>1) disposed between the two surfaces. Each such partial optical path length is the integral of the product of the refractive index at position x within the component and a differential length $dx_i$, as given by Eq. 6:

$$L_0 = \int_{x_1=0}^{L_1} \eta_1 dx_1 + \int_{x_2=0}^{L_2} \eta_2 dx_2 + K + \int_{x_i=0}^{L_i} \eta_i dx_i + K + \int_{x_n=0}^{L_n} \eta_n dx_n \quad \text{Eq. 6}$$

wherein the quantities $L_1, L_2, \ldots, L_n$ are the physical distances traversed by a light beam across each of the respective components. The set of quantities $\{\eta_1, x_1, L_1\}$ apply to the photosensitive material; the remaining quantities apply to other optical components. For proper functioning of an interferometer in accordance with the present invention, all of the quantities $\eta_i$ and $L_i$ should be substantially constant for all $i \neq 1$ and only the quantity $\eta_1$, and possibly $L_i$, change in response to exposure to actinic UV radiation. In the following analysis, it is assumed that all $\eta_i(i \neq 1)$ are constant and also that $L_1$ remains constant. Therefore, the differential optical path length $dL_0$ associated with exposure to actinic UV radiation is given either by $$dL_0 = \int_{x=0}^{L_1} (\partial \eta_1)_x dx = \int_{x=0}^{L_1} (d\eta_1^0) e^{-\alpha x} dx = \frac{1}{\alpha}(1 - e^{-\alpha L_1}) d\eta_1^0 \quad \text{Eq. 7a}$$

if the differential change in refractive index $(\partial \eta_1)_x$ varies with the depth of penetration, x, into the photosensitive material, or, more simply, by $$dL_0 = L_1 d\eta_1 \quad \text{Eq. 7b}$$

if the differential change in refractive index, $d\eta$-, may be assumed to be substantially constant with depth.

The quantity $\alpha$ in Eq. 7a above is the optical absorption coefficient at the wavelength of the actinic radiation and the quantity $d\eta_1^0$ is the differential change in refractive index at the surface of entry of the actinic radiation into the photosensitive layer. Eq. 7a derives from the fact that the differential quantity $(\partial \eta_1)_x$ changes with differential time $\partial t$ according to Eq. 8, given by $$(\partial \eta_1)_x kFe^{-\alpha x} \partial t \quad \text{Eq. 8}$$

wherein k is a constant and F is the photon fluence at the surface of the photosensitive layer.

By substituting either Eq. 7a or Eq. 7b into Eq. 5, the variation of frequency shift with refractive index is given by either $$\frac{dv_i}{d\eta_1^0} = -v_i^0 \left( \frac{1 - e^{-\alpha L_1}}{\alpha L_0} \right) = \frac{-2v_i^0}{\alpha c}(1 - e^{-\alpha L_1})(FSR)^0 \quad \text{Eq. 9a}$$

or by $$\frac{dv_i}{d\eta_1} = -v_i^0 \left( \frac{L_1}{L_0} \right) = \frac{-2v_i^0 L_1}{c}(FSR)^0 \quad \text{Eq. 9b}$$

respectively. Equations 9a–9b provide the rate of change of frequency $dv_i$ of the transmitted wavelengths through the Fabry-Perot interferometer 100 with changing refractive index $d\eta_1$ in terms of known or measurable quantities. In Eqs. 9a–9b, the quantities $v_i$ and FSR on the right-hand-side have been replaced by their respective average values, $V^0_i$ and $(FSR)^0$. This substitution is permissible since both the quantities $dv_i/v_i$ and $d(FSR)/(FSR)$ are small. The value of $v^0_i$ in Eqs. 9a–9b is taken as $v^0_i$=193.1 THz, which is a recommended anchor point for channel positions conforming to the International Telecommunications Union (ITU) grid and is an average value for wavelengths of optical signals utilized for fiber optic telecommunications. The value of $(FSR)^0$ may be taken as the nominal value of channel spacing, which is defined for a particular application. The value of $(FSR)^0$ is typically 25 GHz, 50 GHz, 100 GHz or 200 GHz. With these substitutions, all quantities on the right-hand-side of Eqs. 9a–9b are known or measurable constants.

As an example of the range of frequency shift that may be expected and the use of Eqs. 9a–9b, assume that a Fabry-Perot interferometer 100 comprises a Free Spectral Range, $(FSR)^0$ of 100 GHz, that a 10 µm-thick tuning plate 114 is disposed within the interferometer 100 and that exposure to UV light increases the refractive index of the tuning plate 114 by 0.001 (that is, $\Delta\eta_1$=0.001), wherein the increase in refractive index is substantially constant across the thickness of the tuning plate 114. Then, replacing the differential quantities in Eq. 9b by their corresponding finite changes, $$\Delta v_i = \frac{-2(1.931 \times 10^5 \text{ GHz})(1 \times 10^{-3} \text{ cm})}{(3.0 \times 10^{10} \text{ cm} \cdot \text{sec}^{-1})} \times [100 \text{ GHz}] \times [0.001] = -1.3 \text{ GHz}$$

Figure 1B:
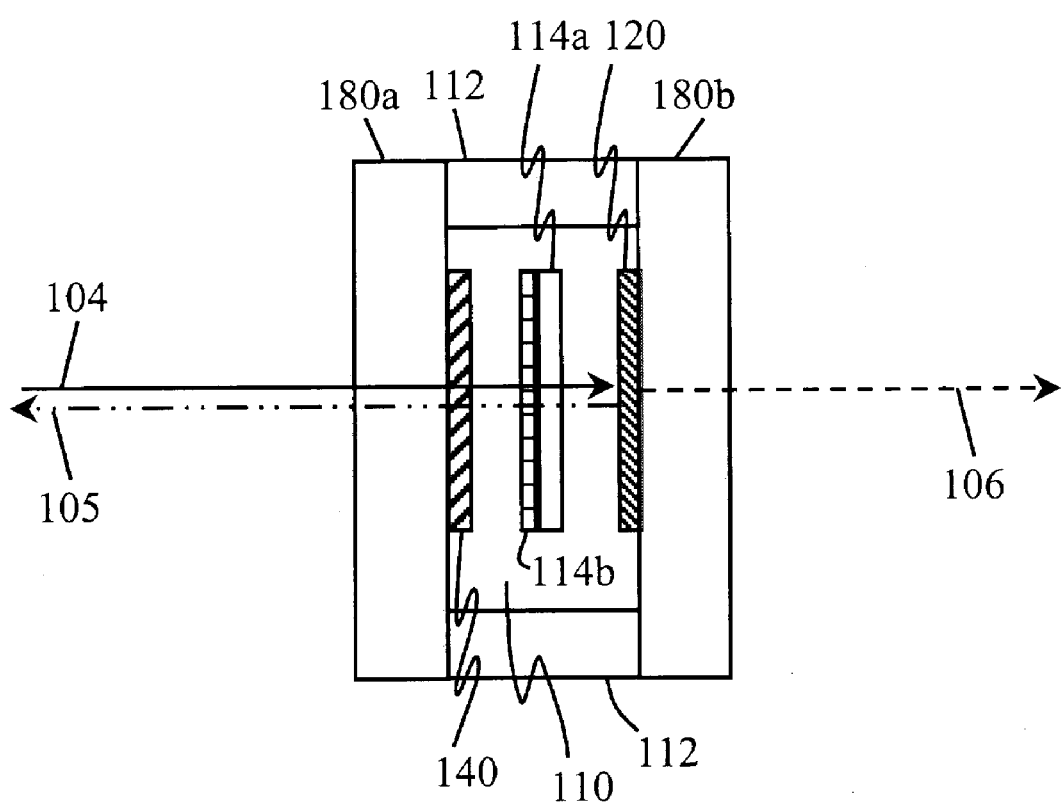
FIG. 1B is an illustration of a second preferred embodiment of an interferometer in accordance with the present invention.
Figure 1C:
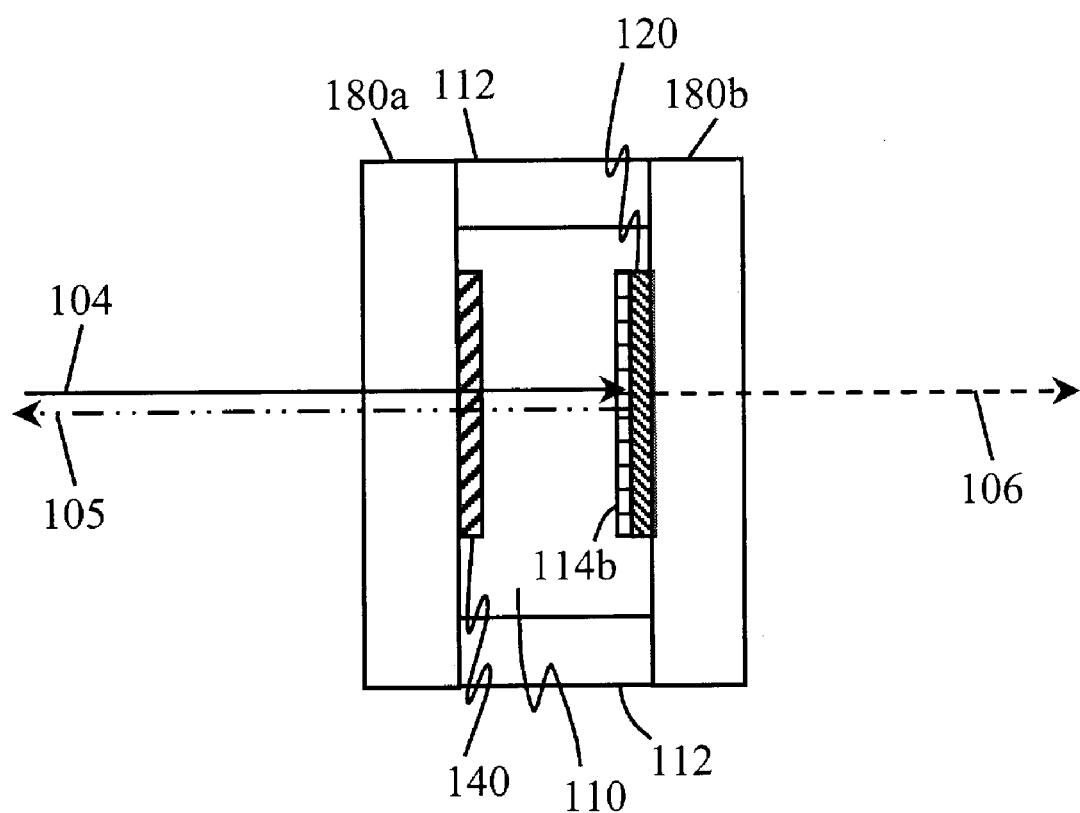
FIG. 1C is an illustration of a third preferred embodiment of an interferometer in accordance with the present invention.

FIGS. 1B–1C are illustrations of a second preferred embodiment and a third preferred embodiment, respectively, of an interferometer in accordance with the present invention. The second interferometer 150 (FIG. 1B) is similar to the interferometer 100 (FIG. 1A) except that the tuning plate comprises a thin-film 114b of photosensitive material disposed or coated onto a substrate portion 114a. The substrate portion 114a is preferably a glass plate. The thin-film 114b may be deposited to a uniform thickness upon the substrate 114a by any one of a number of well-known methods, such as spin-coating of a sol-gel preparation. The third interferometer 170 (FIG. 1C) is similar to the interferometer 100 (FIG. 1A) except that the tuning plate comprises a thin-film 114b of photosensitive material disposed or coated directly onto either the reflective coating 120 or the reflective coating 140. These thin-film configurations are suitable for photosensitive materials that have a high optical absorbance at the wavelength of the actinic UV radiation and for which the depth of penetration of the actinic radiation into the material is shallow.

Figure 2A:
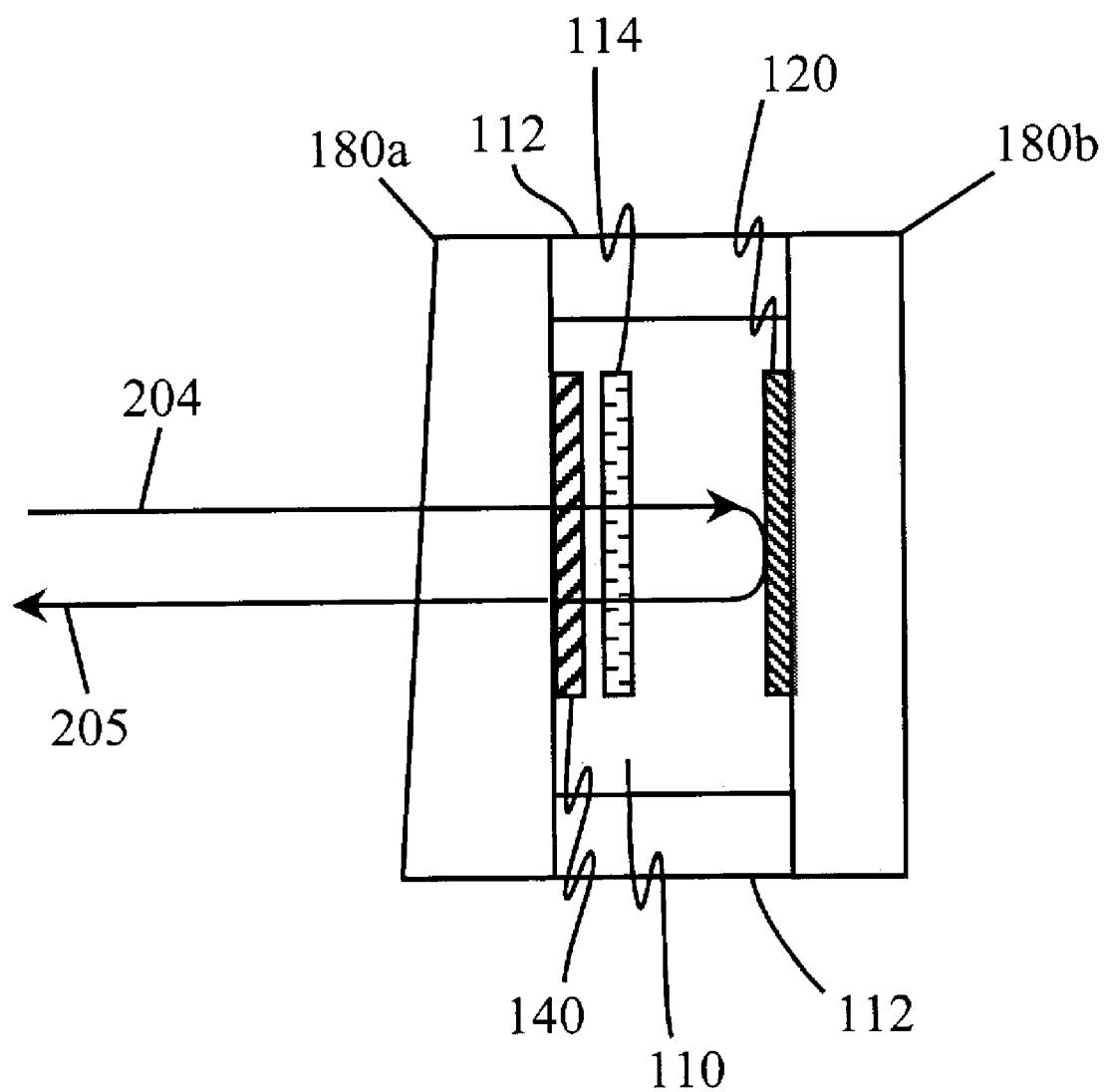
FIG. 2A is an illustration of a fourth preferred embodiment of an interferometer in accordance with the present invention.

FIG. 2A is an illustration of a fourth preferred embodiment of an interferometer in accordance with the present invention. The fourth interferometer 200 shown in FIG. 2A is similar to the interferometer 100 (FIG. 1A) except that the second reflective coating 120 is an approximately 100% reflective coating within the interferometer 200. Accordingly, since there is no transmitted light beam through the second reflective coating 120, the interferometer 200 is a Gires-Tournois interferometer. Since the rear coating 120 reflects all the light input to the Gires-Tournois interferometer 200, there is no transmitted beam and all the wavelengths input to the interferometer 200 in composite optical signal 204 are reflected out of the interferometer 200 in the output composite optical signal 205. Instead of separating the paths of lights of various wavelengths, the Gires-Tournois interferometer 200 produces a periodic phase delay or phase shift, which is a function of wavelength, in the reflected composite optical signal 205.

Figure 2B:
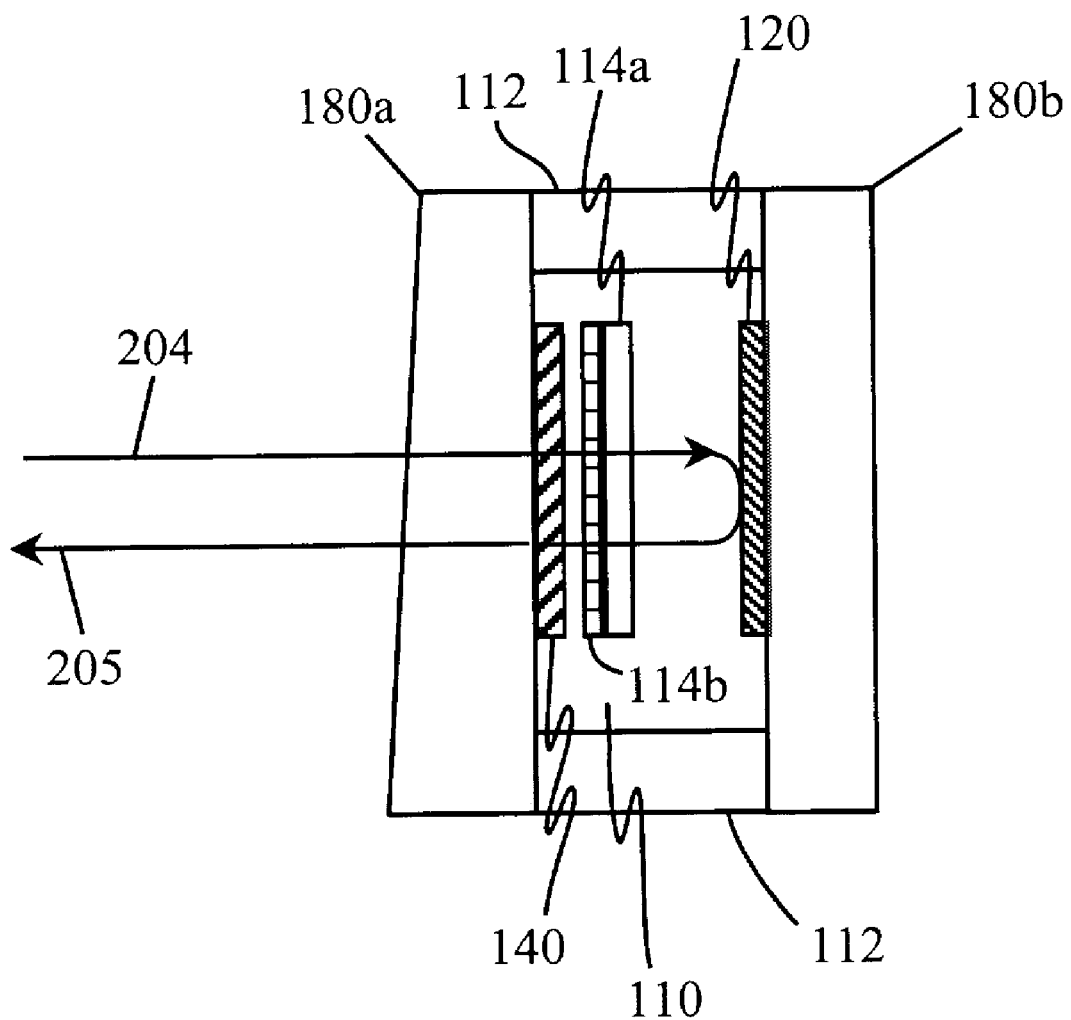
FIG. 2B is an illustration of a fifth preferred embodiment of an interferometer in accordance with the present invention.
Figure 2C:
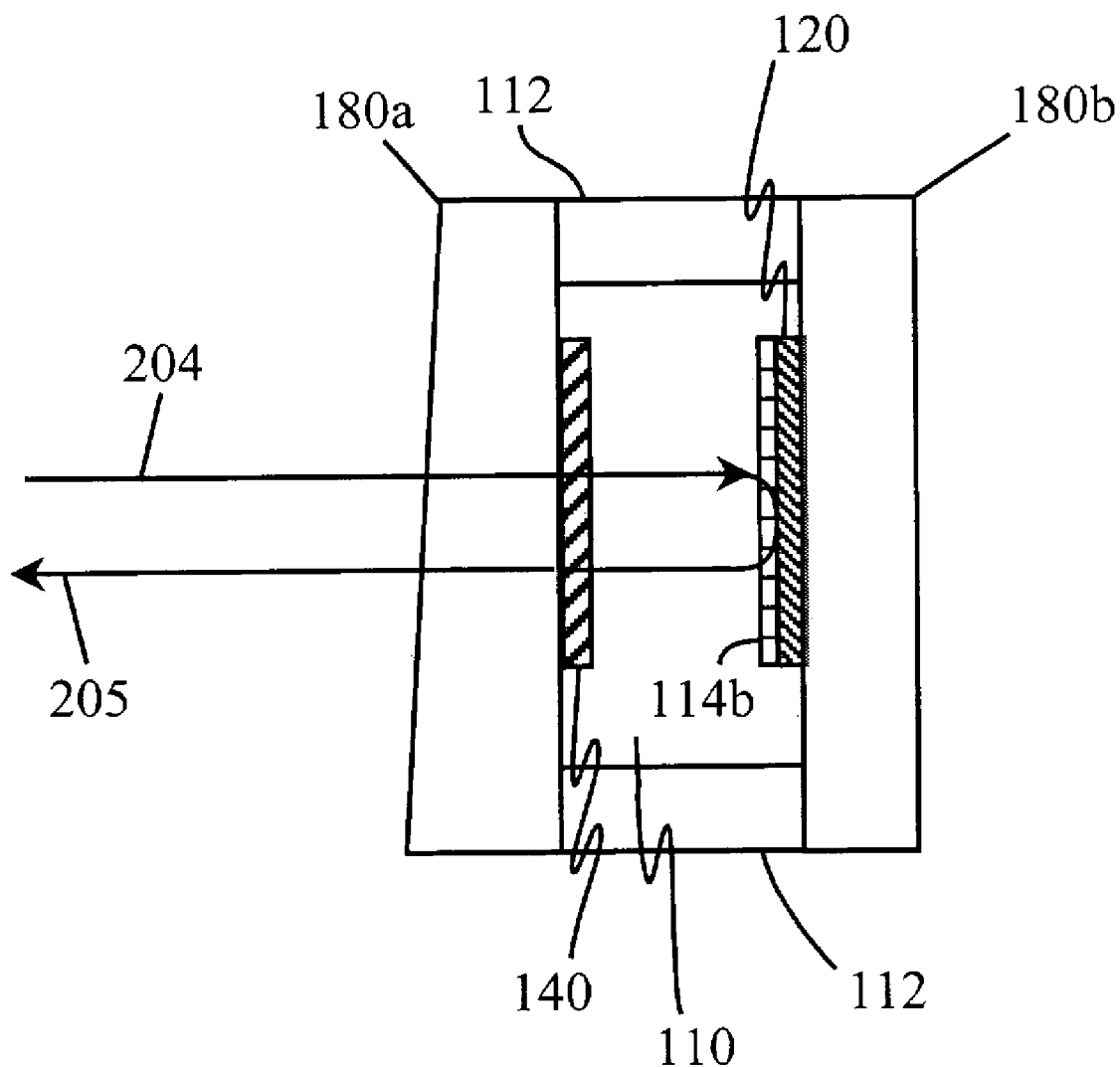
FIG. 2C is an illustration of a sixth preferred embodiment of an interferometer in accordance with the present invention.

FIGS. 2B–2C are illustrations of a fifth preferred embodiment and a sixth preferred embodiment, respectively, of an interferometer in accordance with the present invention. The fifth interferometer 250 (FIG. 2B) is a Gires-Tournois interferometer that is similar to the Gires-Tournois interferometer 200 (FIG. 2A) except that the tuning plate comprises a thin-film 114b of photosensitive material disposed or coated onto a substrate portion 114a. The sixth interferometer 270 (FIG. 2C) is Gires-Tournois interferometer that is similar to the Gires-Tournois interferometer 200 (FIG. 2A) except that the tuning plate comprises a thin-film 114b of photosensitive material disposed or coated directly onto either the partially reflective coating 140 or the approximately 100% reflective coating 120.

Figure 3A:
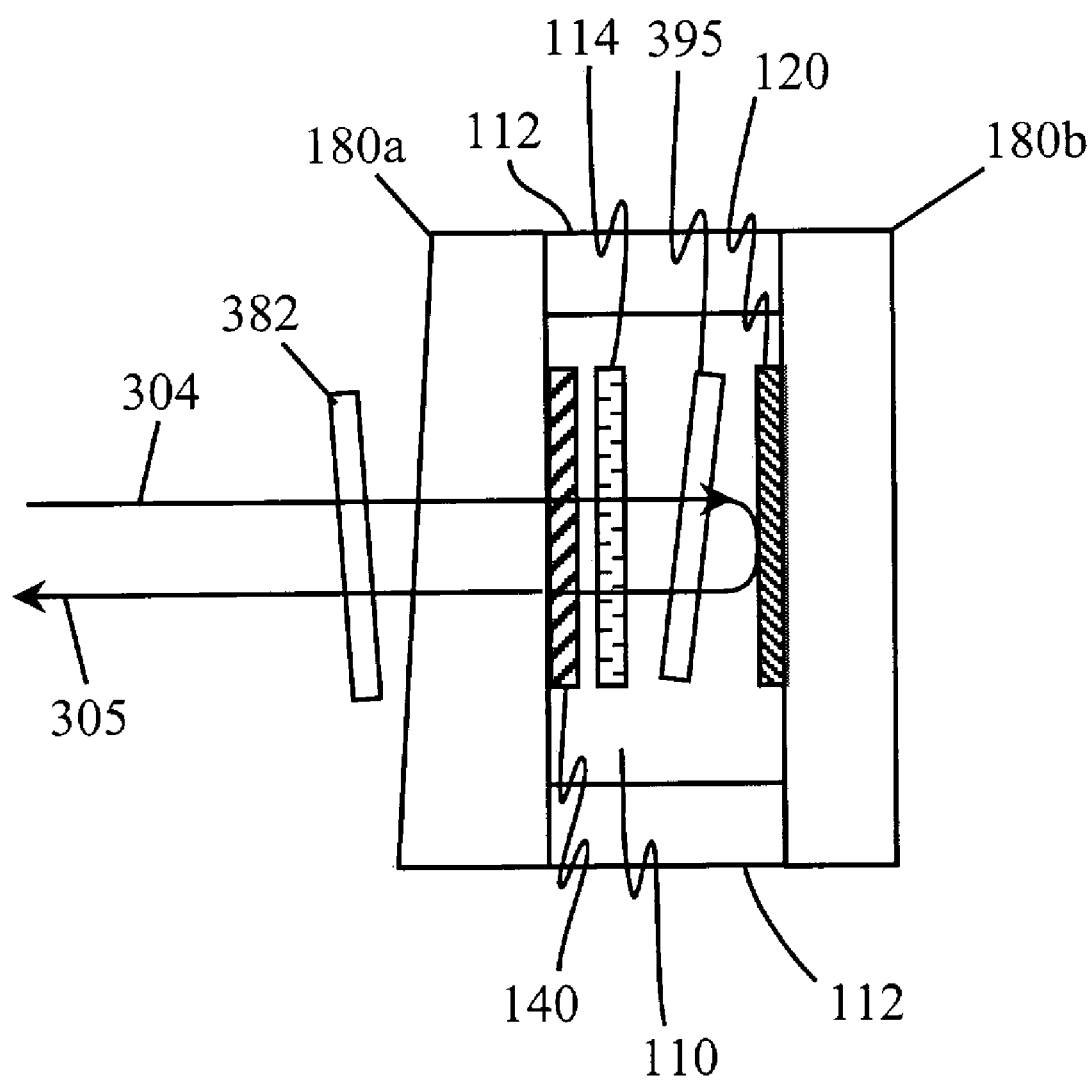
FIG. 3A is an illustration of a seventh preferred embodiment of an interferometer in accordance with the present invention.

FIG. 3A is an illustration of a seventh preferred embodiment of an interferometer in accordance with the present invention. The seventh interferometer 300 (FIG. 3A) comprises all the same components as does the Gires-Tournois interferometer 200 (FIG. 2A). Further, the apparatus 300 comprises an internal birefringent waveplate 395 within the optical cavity 110 optically coupled between the partially reflective coating 140 and the approximately 100% reflective coating 120 and an external birefringent waveplate 382 optically coupled to the first plate 180 outside the optical cavity 110. Therefore, the interferometer 300 comprises a non-linear interferometer of the type disclosed in U.S. Pat. No. 6,169,604 and in U.S. Pat. No. 6,310,690. Both of these patents, which are assigned to the assignee of the present application, are incorporated herein by reference in their entirety. The operation of such an interferometer 300 is described in more detail in these referenced patents. In brief, however, an input linearly polarized light 304 comprised of multiple channels is reflected as light 305, wherein the polarization of a first set of channels comprising reflected light 305 is rotated and the polarization of a second set of channels comprising reflected light 305 and interleaved with the first set of channels is not rotated. The first and second sets of channels may comprise alternating "odd" and "even" channels as shown in FIG. 4 and discussed in reference to that figure or else may comprise sets of bands comprising non-equivalent band widths.

Figure 3B:
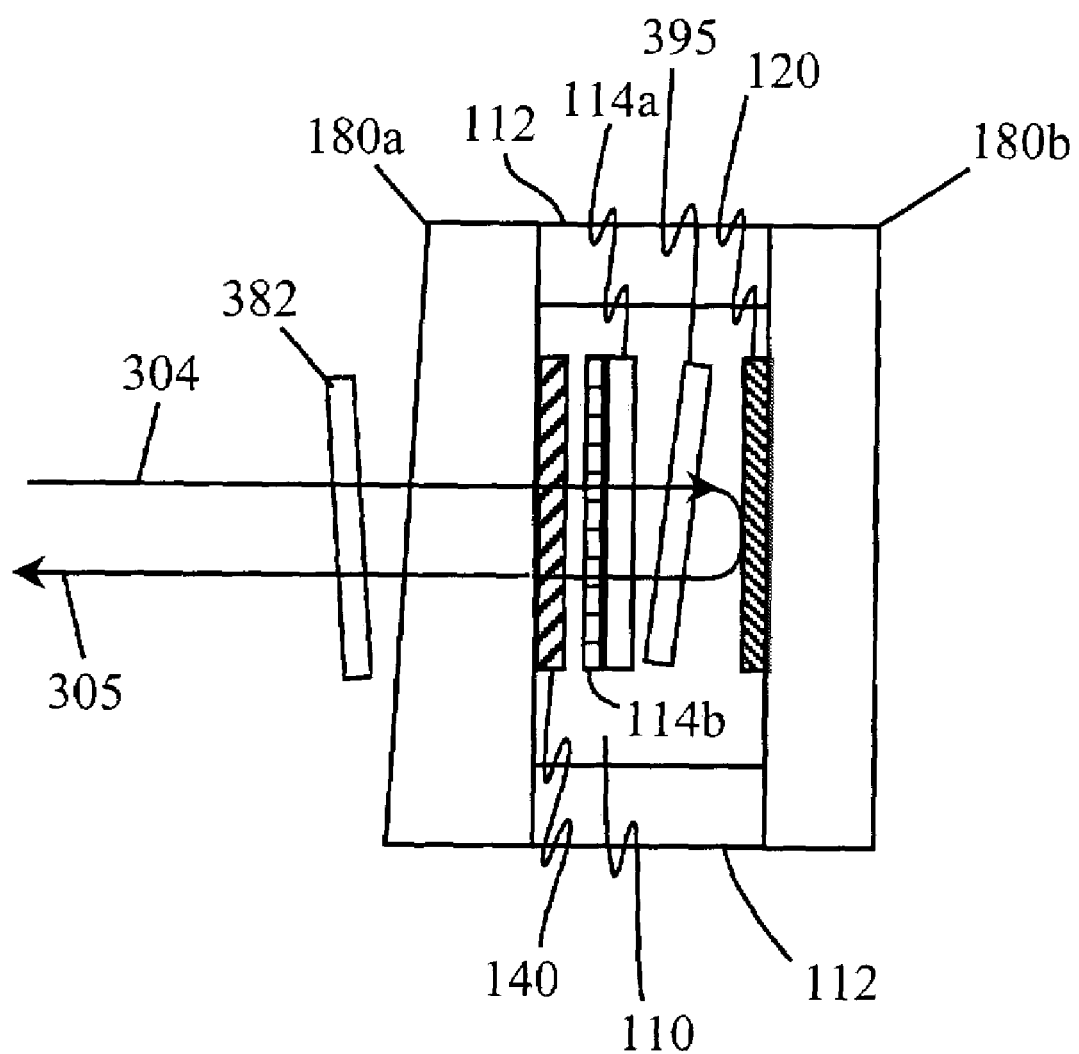
FIG. 3B is an illustration of an eighth preferred embodiment of an interferometer in accordance with the present invention.
Figure 3C:
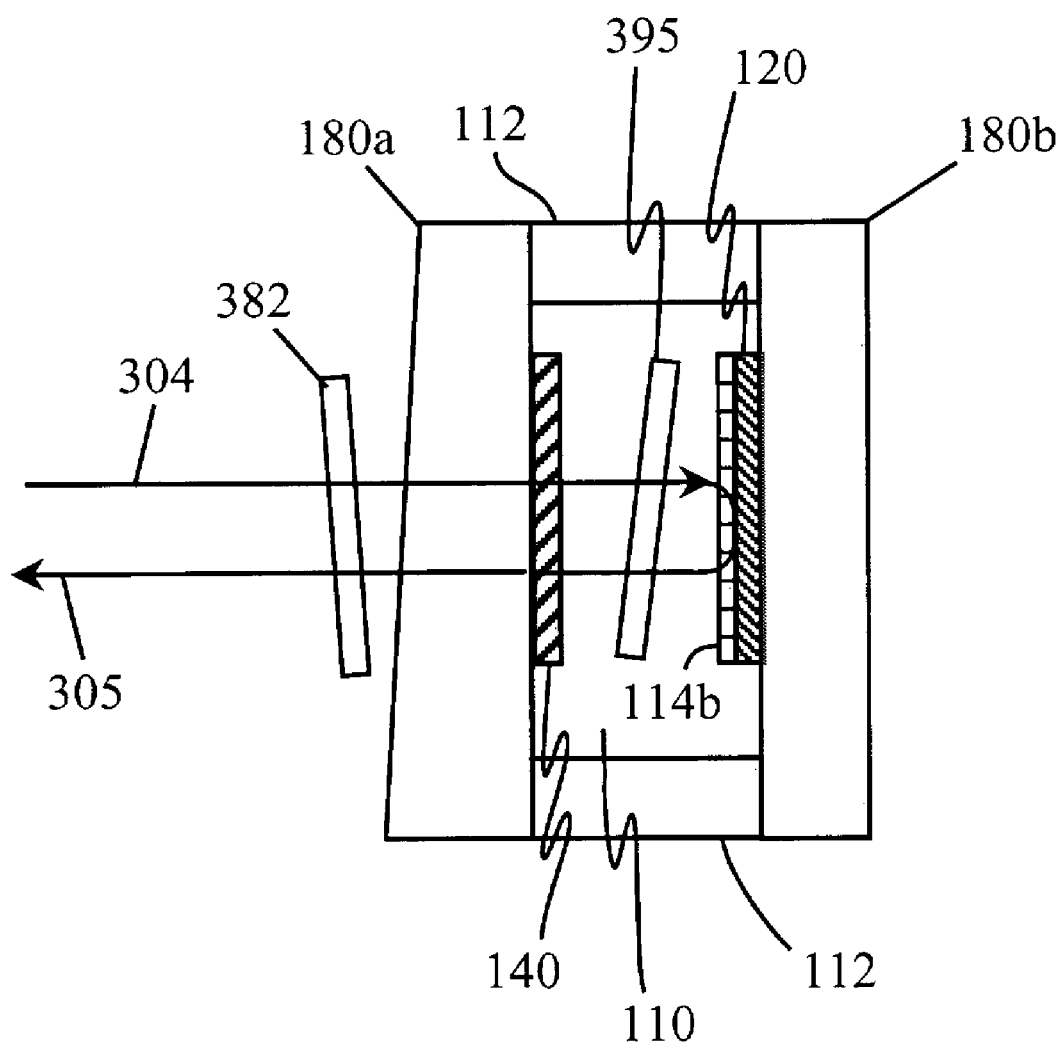
FIG. 3C is an illustration of a ninth preferred embodiment of an interferometer in accordance with the present invention.

FIGS. 3B–3C are illustrations of an eighth preferred embodiment and a ninth preferred embodiment, respectively, of an interferometer in accordance with the present invention. The eighth interferometer 350 (FIG. 3B) is a Gires-Tournois interferometer that is similar to the Gires-Tournois interferometer 300 (FIG. 3A) except that the tuning plate comprises a thin-film 114b of photosensitive material disposed or coated onto a substrate portion 114a. The ninth interferometer 370 (FIG. 3C) is Gires-Tournois interferometer that is similar to the Gires-Tournois interferometer 300 (FIG. 3A) except that the tuning plate comprises a thin-film 114b of photosensitive material disposed or coated directly onto either the partially reflective coating 140 or the approximately 100% reflective coating 120 or the internal waveplate 395.

The exposure of the tuning plate 114 or 114b to actinic UV radiation shifts the wavelength bands of light that are transmitted through or reflected from a Fabry-Perot interferometer in accordance with the present invention, such as the interferometer 100 (FIG. 1A), interferometer 150 (FIG. 1B) or interferometer 170 (FIG. 1C). Alternatively, if the interferometer is a Gires-Tournois interferometer such as interferometer 200 (FIG. 2A), interferometer 250 (FIG. 2B), or interferometer 270 (FIG. 2C), exposure of the tuning plate 114 or 114b to actinic UV radiation shifts the phase of wavelength bands of light that are reflected from the interferometer. If the interferometer is a non-linear interferometer such as interferometer 300 (FIG. 3A), interferometer 350 (FIG. 2B) or interferometer 370 (FIG. 3C), exposure of the tuning plate 114 or 114b to actinic UV radiation changes the polarization of wavelength bands of light that are reflected from the interferometer. As an example of this operation, FIG. 4 illustrates two schematic graphs of the spectrum 421 of pass bands of the polarization-rotated light and the spectrum 422 of pass bands of non-polarization-rotated light after the light is reflected from either interferometer 300, interferometer 350, or interferometer 370. The locations of "odd" channels 424 and of "even" channels 426 are also shown in the graphs of FIG. 4.

Figure 4:
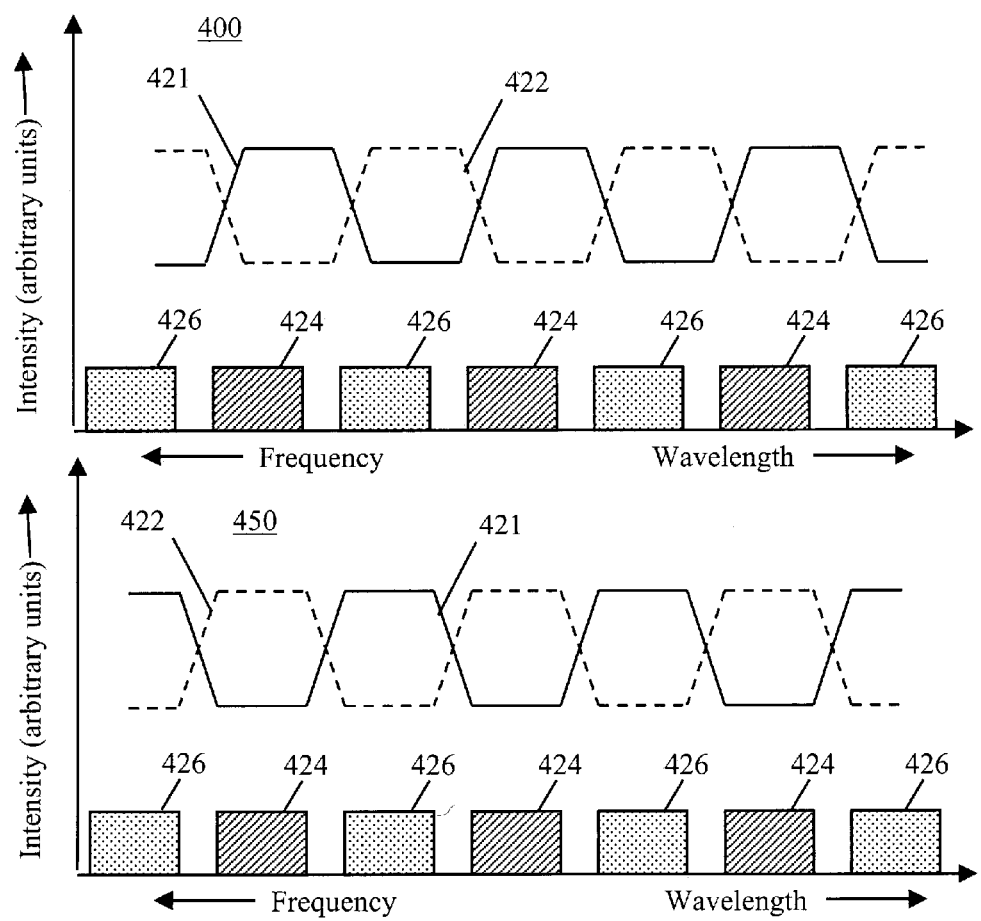
FIG. 4 is a pair of schematic graphs of the spectrum of light after interaction with interferometer in accordance with the present invention.

The upper graph 400 and the lower graph 450 of FIG. 4 respectively represent the spectra of bands reflected from a non-linear interferometer, such as interferometer 300 (FIG. 3A), interferometer 350 (FIG. 3B) or interferometer 370 (FIG. 3C), in a first out-of-adjustment state and in a second properly adjusted state. The out-of-adjustment state generally represents the spectra prior to exposure to actinic UV radiation. Upon exposure of the tuning plate to actinic UV radiation, the spectra 421–422 of bands effectively "shift" to either the left or the right accordingly. A very slight change in the band widths also accompanies this shift, but this effect is negligible. The effect of the shift of the spectra of bands is to cause the spectrum 421 of bands of polarization rotated light to either coincide with the locations of the even channels 426 or the odd channels 424, as may be seen in comparing the two graphs of FIG. 4. Similarly, exposure to actinic UV radiation causes spectral shifts in the positions of wavelength bands that are transmitted through and reflected from interferometer 100, interferometer 150 or interferometer 170 or causes phase shifts in the wavelength bands reflected from interferometer 200, interferometer 250 or interferometer 270.

Figure 5:
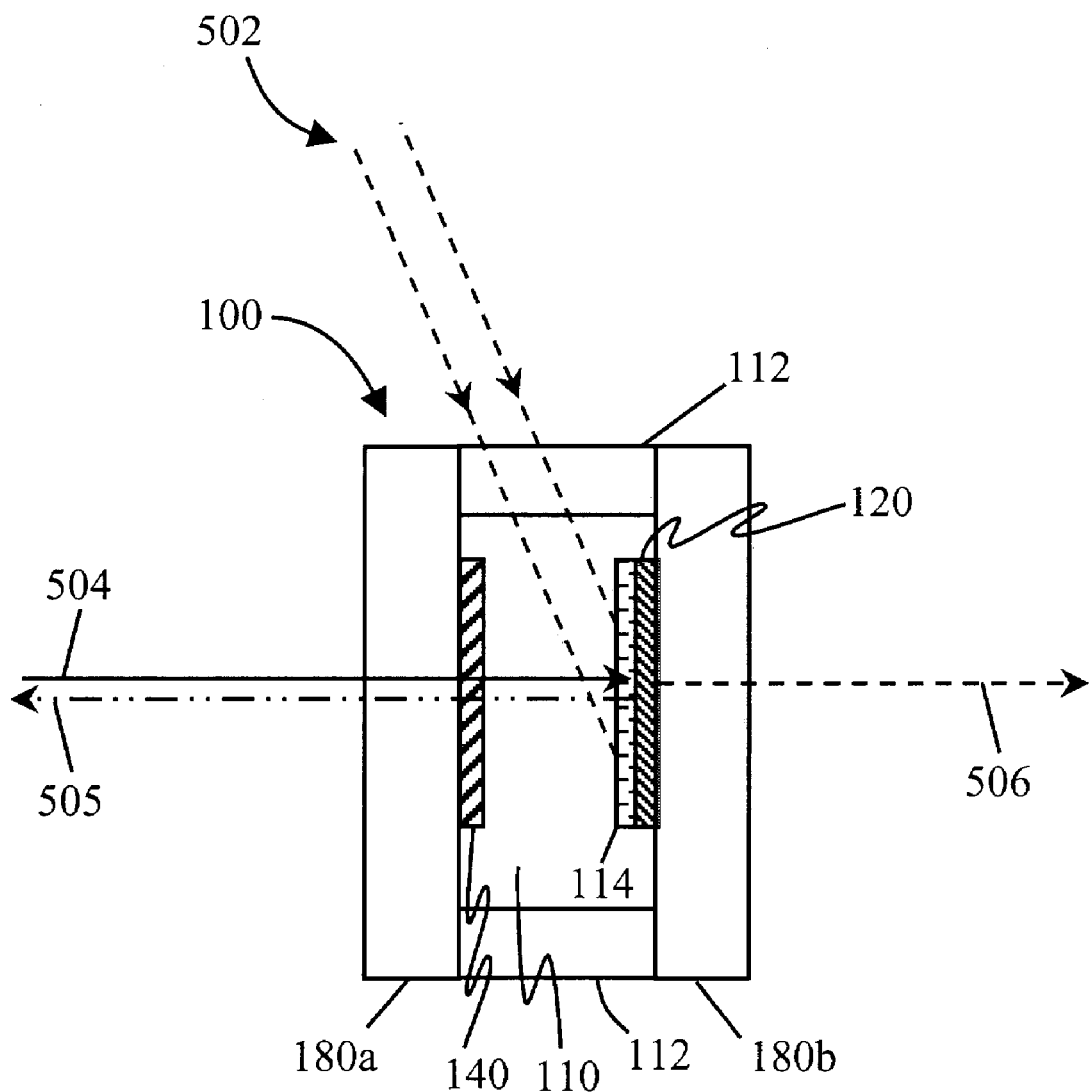
FIG. 5 is an illustration of a method for tuning the optical properties of an interferometer in accordance with the present invention.

FIG. 5 is an illustration of a method for tuning or adjusting the positions of the transmission bands, pass bands or reflection bands of an interferometer in accordance with the present invention. The method shown in FIG. 5 will generally be utilized during the fabrication of any of the preferred embodiments of the interferometer in accordance with the present invention. The method in FIG. 5 is illustrated using the interferometer 100 as an example. However, the method may be utilized in conjunction with any of the interferometers described herein.

In the method illustrated in FIG. 5, a light beam 502 of UV actinic radiation is provided to the tuning plate 114 through an opening, gap or space at either the top of or side of the interferometer. Alternatively, the beam 502 may be transmitted through the spacer 112, if the material comprising the spacer is sufficiently transparent to ultraviolet light. Alternatively, the beam 502 may be transmitted through the partially reflective coating 140 provided that this coating does not significantly absorb or reflect light of the wavelength of the beam 502. Preferably the light of beam 502 is provided by a UV laser of an appropriate wavelength, such as an ArF or KrF excimer laser or a frequency-quadrupled Nd:YAG laser. Alternatively, the UV light may be provided by a UV lamp, such as an excimer lamp. The absorption of the beam 502 within the photosensitive material comprising the tuning plate 114 causes a permanent refractive index change in this material which modifies the optical path length between partially reflective coating 140 and reflective coating 120. The refractive index may vary exponentially with depth within the tuning plate, as may be seen from the integrated form of Eq. 8. A light beam 504 is introduced into the interferometer along the path nominally used for introduction of optical signals and either the transmitted light 506 or the reflected light 505 is monitored so as to determine the degree of coincidence between transmitted or reflected spectral bands and standard channel positions, as illustrated in FIG. 4. The monitoring may be performed simultaneously with the provision of the UV beam 502 to the tuning plate 114, or may be performed between separate applications of the UV beam 502 to the tuning plate 114.

Prior to application of the actinic UV radiation to the tuning plate 114 in the method shown in FIG. 5, the peaks in the periodic spectrum of transmission bands or reflection bands will generally appear as shown in the top graph of FIG. 4, wherein the peaks of the spectra 421–422 do not correctly coincide with positions of the channels 424–426. The peaks of the spectra gradually migrate, either to the left or to the right, as the optical path length changes as a result of changing refractive index of the tuning plate 514. The application of the UV beam 502 is stopped once the peaks in the periodic spectrum of transmission bands or reflection bands adequately coincide with the channel positions, as shown in the lower graph of FIG. 4. At this point, the interferometer 100 is properly adjusted.

The monitoring, within the adjusting method shown in FIG. 5, of the peak positions of the spectrum of the transmitted light 506 or the reflected light 505 may be performed immediately after the light passes out of the interferometer 100 or may be performed after the light further passes through and is output from an optical apparatus that incorporates the interferometer 100. For instance, if the interferometer under adjustment is of the type shown in FIGS. 3A–3C, the interferometer may be incorporated into a Dense Wavelength Division Multiplexer (DWDM) apparatus. Suitable DWDM apparatuses are disclosed in U.S. Pat. Nos. 6,130,971; 6,169,828; 6,215,926; 6,310,690; 6,263,129; 6,307,677 and 6,205,270, all of which are assigned to the assignee of the present invention and incorporated herein by reference in their entirety. Further channel separator apparatuses incorporating an interferometer of the type shown in FIGS. 3A–3C are disclosed in co-pending U.S. Patent Application titled "Multi-Functional Optical Device Utilizing Multiple Polarization Beam Splitters and Non-Linear Interferometers", Ser. No. 09/630,891, filed on Aug. 2, 2000 and in U.S. Pat. No. 6,396,629. Both are assigned to the assignee of the present invention and incorporated herein by reference in their entirety.

An improved method and apparatus for an optical interferometer have been disclosed. An interferometer in accordance with the present invention may be easily adjusted through exposure to actinic UV light so that its pass bands, transmission bands or reflection bands align to standard channel positions or such that the pass bands of an apparatus incorporating the interferometer align to standard channel positions.

Although the present invention has been described in accordance with the embodiments shown and discussed, one of ordinary skill in the art will readily recognize that there could be variations to the embodiments and those variations would be within the spirit scope of the present invention. Accordingly, many modifications may be made by one of ordinary skill in the art without departing from the spirit and scope of the appended claims.

The invention claimed is:

1. An interferometer, comprising:
   a first glass plate optically coupled to a second glass plate, forming an optical interferometric cavity therebetween;
   a spacer coupled on a first end to the first glass plate and on a second end to the second glass plate such that the optical interferometric cavity maintains a substantially constant width;
   a first reflective coating coupled to the first glass plate within the optical interferometric cavity, wherein the first reflective coating is partially reflective;
   a second reflective coating coupled to the second glass plate within the optical interferometric cavity, wherein the second reflective coating is at least partially reflective;
   a tuning plate residing within the interferometric cavity and optically coupled to the first and second reflective coatings, wherein the tuning plate comprises a photosensitive material, wherein a refractive index of the photosensitive material may be modified by exposure to light;
   a first birefringent wave late residing within the optical interferometric cavity and optically coupled to the tuning plate; and
   a second birefringent wave plate residing outside the optical interferometric cavity and optically coupled to the first glass plate.

2. The interferometer of claim 1, wherein the tuning plate is coupled to a substrate.

3. The interferometer of claim 1, wherein the tuning plate is coupled to the first reflective coating.

4. The interferometer of claim 1, wherein the tuning plate is coupled to the second reflective coating.

5. The interferometer of claim 1, wherein the second reflective coating is approximately 100% reflective.

6. The interferometer of claim 5, wherein the tuning plate is coupled to a substrate.

7. The interferometer of claim 5, wherein the tuning plate is coupled to the first reflective coating.

8. The interferometer of claim 5, wherein the tuning plate is coupled to the second reflective coating.

9. The interferometer of claim 1, wherein the first birefringent waveplate is optically coupled between the tuning plate and the second reflective coating.

10. The interferometer of claim 1 wherein the tuning plate is coupled to a substrate.

11. The interferometer of claim 1, wherein the tuning plate is coupled to the first reflective coating.

12. The interferometer of claim 9, wherein the tuning plate is coupled to the second reflective coating.

13. The interferometer of claim 1, wherein the refractive index of the photosensitive material may be modified by exposure to actinic ultraviolet radiation.

14. The interferometer of claim 1, wherein the modification of the refractive index of the photosensitive material modifies an optical path between the first and second reflective coatings.

15. An interferometer, comprising:
   a first glass plate optically coupled to a second glass plate, forming an optical interferometric cavity therebetween;
   a spacer coupled on a first end to the first glass plate and on a second end to the second glass plate such that the optical interferometric cavity maintains a substantially constant width;
   a first reflective coating coupled to the first glass plate within the optical interferometric cavity, wherein the first reflective coating is partially reflective;
   a second reflective coating coupled to the second glass plate within the optical interferometric cavity, wherein the second reflective coating is at least partially reflective;
   a tuning plate residing within the interferometric cavity and optically coupled to the first and second reflective coatings, wherein the tuning plate comprises a photosensitive material, wherein a refractive index of the photosensitive material may be modified by exposure to light;
   an input composite optical signal entering the optical interferometric cavity through the first glass plate;
   a reflective light comprising a first periodic pattern of wavelengths exiting the optical interferometric cavity through the first glass plate; and
   a transmitted light comprising a second periodic pattern of wavelengths exiting the optical interferometric cavity through the second glass plate,
   wherein the modification of the refractive index of the photosensitive material modifies positions of the first and second periodic patterns of wavelengths.

16. The interferometer of claim 15, further comprising:
   an output composite optical signal exiting the optical interferometric cavity through the first glass plate, wherein a periodic phase of the output composite optical signal is shifted from a periodic phase of the input composite optical signal.

17. A method for adjusting an interferometer, comprising the steps of:
   (a) providing an interferometer, comprising:
      a first glass plate optically coupled to a second glass plate, forming an optical interferometric cavity therebetween,
      a spacer coupled on a first end to the first glass plate and on a second end to the second glass plate such that the optical interferometric cavity maintains a substantially constant width,
      a first reflective coating coupled to the first glass plate within the optical interferometric cavity, wherein the first reflective coating is partially reflective,
      a second reflective coating coupled to the second glass plate within the optical interferometric cavity, wherein the second reflective coating is at least partially reflective, and
      a tuning plate residing within the interferometric cavity and optically coupled to the first and second reflective coatings, wherein the tuning plate comprises a photosensitive material, wherein a refractive index of the photosensitive material may be modified by exposure to a light beam;
   (b) providing the light beam to the tuning plate;
   (c) providing an input light beam into an optical path between the first and second reflective coatings, wherein the input light beam is separate and distinct from the light beam provided to the tuning plate;
   (d) monitoring an output light beam to determine positions of spectral bands of the output light beam, wherein the monitoring step (d) is performed between separate applications of the light beam to the tuning plate; and
   (e) ceasing the light beam to the tuning plate once the positions coincide with pre-determined positions.

18. The method of claim 17, wherein the light beam provided to the tuning plate is provided through an opening in the interferometer.

19. The method of claim 17, wherein the light beam provided to the tuning plate is provided through the second reflective coating.

20. The method of claim 17, wherein the light beam provided to the tuning plate is provided by an ultraviolet radiation laser or lamp of appropriate wavelength.

21. The method of claim 17, wherein the monitoring step (d) is performed simultaneously with providing the light beam to the tuning plate.

22. The interferometer of claim 1, wherein the spacer comprises a low-thermal-expansion material.

23. The interferometer of claim 1, wherein the spacer comprises a zero-thermal-expansion material.

* * * * *